A. H. WAGNER.
Millstone Balance.
No. 78,624.
Patented June 2, 1868.
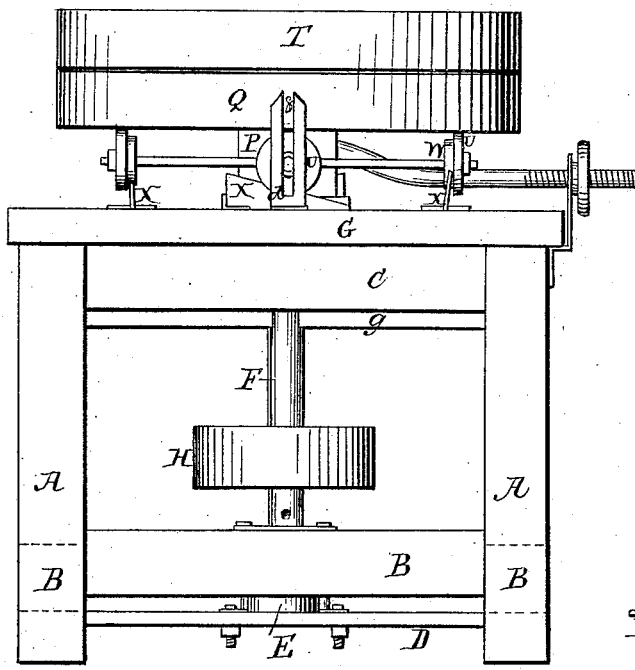
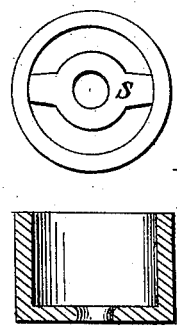
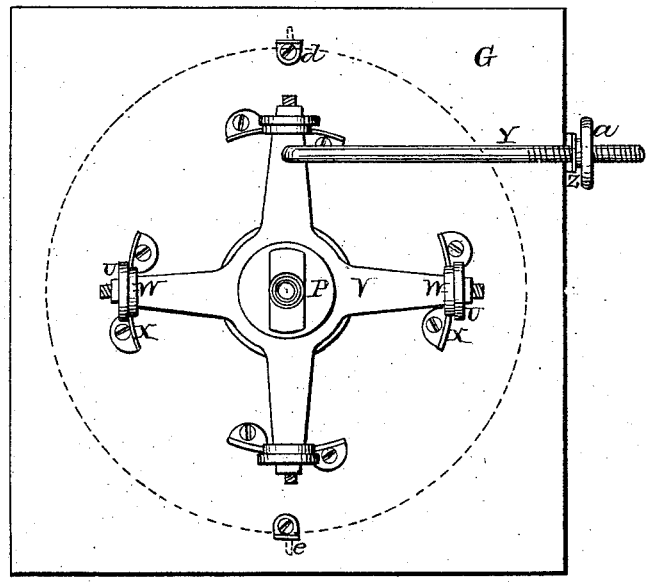
Witnesses
Thos. A. Connolly
Wm Dennis
Inventor
Ausbert H. Wagner
By his Atty. J. Dennis Jr.

United States Patent Office.

AWSBERT H. WAGNER, OF STAUNTON, VIRGINIA.

Letters Patent No. 78,624, dated June 2, 1868.

IMPROVEMENT IN GRINDING-MILLS.

The Schedule referred to in these Letters Patent and making part of the same.

TO ALL WHOM IT MAY CONCERN:

Be it known that I, AWSBERT H. WAGNER, of Staunton, Augusta county, State of Virginia, have invented certain new and useful Improvements in Grinding-Mills; and I do hereby declare the following description and accompanying drawings are sufficient to enable any person skilled in the art or science to which it most nearly appertains to make and use my said invention or improvements without further invention or experiment.

The nature of my invention and improvements consists in arranging some inclined planes and rollers under the bed-stone, to raise and lower it, and adjust it to the upper stone; also, in a spider and screw-rod, for adjusting the rollers on the inclined planes under the stone.

In the accompanying drawings—

Figure 1 is an elevation of a mill with my improvements.
Figure 2 is a plan, with the stone shown by dotted line.
Figure 3 is the lower end of the spindle and step-box.
Figure 4, the upper end of the spindle, enlarged, with the nut and driver.
Figure 5, the bushing and plate in the upper stone, enlarged.

In the frame of the mill there are four posts. Two of these are shown at A A, connected by the bar B and girder C, making a strong quadrangular cubical frame, to support the other parts of the mill. D is a centre-bar, fastened to the under side of the bars B B, shown by dotted lines in fig. 1; and to this bar the step-box E is fastened, for the mill-spindle F to turn in. The upper journal of the spindle turns in the floor G, fastened to the top of the frame, or in a bushing, fastened to the floor or stone, or both, as may be preferred. A gear or pulley, H, may be fastened to the spindle F, to turn it from some moving-power, and operate the mill. The step-box E, for the foot of the spindle to turn in, is provided with two flanges, I I, by which it is fastened to the bar D. The inside of the box E is larger than the foot of the spindle, which has a collar, J, on it, above the pin K, with a lug on the collar against the pin, so that the pin will turn the collar under the bushing L, which fits the inside of the step-box, and is prevented from turning by the screw M in the step-box; and above the bushing there is a stationary perforated plate, N, around the spindle, with bolts passing through its arms into the bar D, to hold the spindle and upper stone down against the upward pressure of the under stone when grinding. The bushing P is fastened to the floor G, and extends up into the lower stone Q, around the spindle. The upper end of the spindle has a conical shoulder, R, for the plate S to rest on, which is fastened in the upper stone T in some convenient manner, and the grain passes down each side of this plate, and between the stones, to be ground. The plate S may be countersunk on one or both sides, and there is a conical nut, S', fitted to the top of the spindle, and screwed down on to the plate, so as to hold the stone down, when grinding, against the pressure of the lower stone, which is raised up against it by the rollers U U, which act against the under side of the lower stone, and are fitted to turn on the arms of the spider-frame V, which is fitted to turn on the bushing P, as shown in the drawing. The spider V may have three or more arms, with rollers U U on the ends, and just inside of the rollers U U the rollers W W, which roll on the inclined planes X X as the spider is vibrated by the rod Y, which passes through the stand Z, fastened to the frame, so that, by turning the nut $a$, the rod moves the spider, carrying the rollers W up the inclined planes X, and raises the lower stone Q up against the stone, T, or adjusts the lower stone to the upper one, to make them grind fine or coarse, as desired. The driver $b$ is fastened to the spindle just below the conical shoulder R, and has a horn projecting upwards at each end, which horns act against the plate S, and turn the upper stone.

The bifurcated stands $d$ are fastened to the floor G, for the pins $e\ e$ to traverse in as the stone moves up and down, which stands and pins prevent the stone from turning. The spindle F is flattened on one or more sides, to give motion to the bar $g$, to shake the shoe, which may be connected to it.

It is a great advantage to make the shoulder on the upper end of the spindle conical, and the under side of the nut conical, also, as it permits the plate in the upper stone to vibrate and adapt the upper to the lower stone.

In combination with the lower millstone, I claim—

The spider V, the rollers U W, the inclines X X, the rod Y, and nut $a$, when arranged and operating in the manner and for the purposes specified.

AWSBERT H. WAGNER.

Witnesses:
B. F. POINTZ,
P. H. TROUT.